US012254571B2

(12) United States Patent
Young et al.

(10) Patent No.: US 12,254,571 B2
(45) Date of Patent: Mar. 18, 2025

(54) PERSONAL SPACE BUBBLE IN VR ENVIRONMENTS

(71) Applicant: Sony Interactive Entertainment Inc., Tokyo (JP)

(72) Inventors: Kristine Young, San Mateo, CA (US); Rui Yang, San Mateo, CA (US); Courtney Yingling, San Mateo, CA (US); Victoria Dorn, San Mateo, CA (US); Tatianna Forget, San Mateo, CA (US); Olga Rudi, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 235 days.

(21) Appl. No.: 17/534,205

(22) Filed: Nov. 23, 2021

(65) Prior Publication Data

US 2023/0163987 A1     May 25, 2023

(51) Int. Cl.
*G06T 19/00*     (2011.01)
*G06V 40/20*     (2022.01)
(Continued)

(52) U.S. Cl.
CPC .............. *G06T 19/00* (2013.01); *G06V 40/20* (2022.01); *G10L 15/08* (2013.01); *G10L 15/22* (2013.01);
(Continued)

(58) Field of Classification Search
None
See application file for complete search history.

(56) References Cited

U.S. PATENT DOCUMENTS

| 2007/0185909 A1* | 8/2007 | Klein | G06F 8/20 |
| 2013/0036372 A1* | 2/2013 | Priebe | G06F 3/0481 |
| | | | 715/757 |

(Continued)

OTHER PUBLICATIONS

Kolesnichenko, Anya, Joshua McVeigh-Schultz, and Katherine Isbister. "Understanding emerging design practices for avatar systems in the commercial social vr ecology." Proceedings of the 2019 on Designing Interactive Systems Conference. 2019. (Year: 2019).*

(Continued)

*Primary Examiner* — Sarah Le
(74) *Attorney, Agent, or Firm* — Kilpatrick Townsend & Stockton LLP (57) ABSTRACT

A system and method for providing automated intervention in a virtual environment is disclosed. Intervention settings for a user are stored, wherein the intervention settings for the user includes one or more customized intervention triggers each corresponding to one or more trigger conditions and an intervention response. A current session associated with a user device of the user is monitored, wherein monitoring the current session includes analyzing interactions between the user and one or more other users in a virtual environment of the current session based on the intervention settings. One of the intervention triggers is identified as having occurred in the current session based on detecting the corresponding trigger conditions in the virtual environment. A workflow associated with the intervention response that corresponds to the identified intervention trigger is modulated based on the interactions between the user and the other users in the virtual environment. The intervention response is executed in the virtual environment of the current session based on the modulated workflow.

20 Claims, 5 Drawing Sheets

(51) Int. Cl.
  *G10L 15/08*   (2006.01)
  *G10L 15/22*   (2006.01)
  *H04L 12/18*   (2006.01)
  *A63F 13/63*   (2014.01)
  *A63F 13/79*   (2014.01)

(52) U.S. Cl.
  CPC .......... *H04L 12/1822* (2013.01); *A63F 13/63* (2014.09); *A63F 13/79* (2014.09); *G06T 2219/024* (2013.01); *G10L 2015/088* (2013.01); *G10L 2015/223* (2013.01)

(56) References Cited

U.S. PATENT DOCUMENTS

| | | | |
|---|---|---|---|
| 2014/0244834 A1* | 8/2014 | Guedalia | H04W 4/08 |
| | | | 709/224 |
| 2019/0057686 A1* | 2/2019 | Yong | G06F 40/30 |
| 2019/0344185 A1* | 11/2019 | Fargo | G06T 19/20 |
| 2021/0339143 A1* | 11/2021 | Bar-Zeev | G06F 3/011 |
| 2022/0148097 A1* | 5/2022 | Miller | H04L 51/046 |

OTHER PUBLICATIONS

ItspaceVR, "Introducing our new space bubble", posted Jul. 20, 20216 ("AltspaceVR") https://medium.com/@AltspaceVR/introducing-our-new-space-bubble-3d1128128e48 (Year: 2016).*

* cited by examiner

PERSONAL SPACE BUBBLE IN VR ENVIRONMENTS

BACKGROUND OF THE INVENTION

1. Field of the Invention

The present system generally relates to providing automated intervention in a virtual environment. More specifically, the present system relates to providing automated intervention in response to interaction triggers in a virtual environment.

2. Description of the Related Art

Modern digital communication methods and widespread availability of internet connectivity allow users from many parts of the world to interact in virtual environments. User interactions in such virtual settings can include digital gameplay, chat over text, voice, and video channels, use of a webcam to host meetings and videoconferences, and use of head-mounted or projection-based virtual reality displays to interact with other users in two- or three-dimensional virtual environments. Virtual interactions between users are often substituted in place of in-person gatherings for a variety of reasons, such as safety, cost, and convenience.

While virtual interactions can provide benefits over in-person interactions for users, such as increased physical safety for a user in a crowd, anonymity in a virtual space can introduce drawbacks to virtual interactions, including increased opportunity for behavioral misconduct by users. Anonymized or pseudonymous user-names, avatars, and other virtual representations associated with a real-world user in a virtual environment may obfuscate the identity of a user in a way that differs from face-to-face exchanges. Public virtual sessions offer unrestricted communication in which malicious participants may abuse, offend, or bully other users while their identities otherwise remain unknown. Such a lack of accountability may allow a user to act in a manner that might be offensive or uncomfortable for another user with little or no repercussions or consequences. Many virtual and online platforms may lack the tools to allow a user to address or resolve the situation within the virtual session, thereby leaving misconduct or harassment to go unchecked. In such a shared, multiuser virtual environment, a user may be forced to choose between abandoning the session or tolerating such behavior.

Therefore, there is a need in the art for providing a system for automated intervention in a virtual environment.

SUMMARY OF THE CLAIMED INVENTION

Embodiments of the present invention include methods for providing automated intervention in a virtual environment. Intervention settings for a user may be stored, wherein the intervention settings for the user includes one or more customized intervention triggers each corresponding to one or more trigger conditions and an intervention response. A current session associated with a user device of the user may be monitored, wherein monitoring the current session includes analyzing interactions between the user and one or more other users in a virtual environment of the current session based on the intervention settings. One of the intervention triggers may be identified as having occurred in the current session based on detecting the corresponding trigger conditions in the virtual environment. A workflow associated with the intervention response that corresponds to the identified intervention trigger based on the interactions between the user and the other users in the virtual environment may be modulated. The intervention response in the virtual environment of the current session based on the modulated workflow may be executed.

Embodiments of the present invention also include systems for providing automated intervention in a virtual environment. The system includes a memory that may store intervention settings for a user, wherein the intervention settings for the user includes one or more customized intervention triggers each corresponding to one or more trigger conditions and an intervention response. The system also includes a processor that executes instructions stored in memory that may monitor a current session associated with a user device of the user, wherein monitoring the current session includes analyzing interactions between the user and one or more other users in a virtual environment of the current session based on the intervention settings, identify that one of the intervention triggers has occurred in the current session based on detecting the corresponding trigger conditions in the virtual environment, modulate a workflow associated with the intervention response that corresponds to the identified intervention trigger based on the interactions between the user and the other users in the virtual environment, and execute the intervention response in the virtual environment of the current session based on the modulated workflow.

Embodiments of the present invention also include a non-transitory computer-readable storage medium having embodied thereon a program, the program being executable by a processor to perform a method for providing automated intervention in a virtual environment. The method may include storing intervention settings for a user in, wherein the intervention settings for the user includes one or more customized intervention triggers each corresponding to one or more trigger conditions and an intervention response. The method may also include monitoring a current session associated with a user device of the user, wherein monitoring the current session includes analyzing interactions between the user and one or more other users in a virtual environment of the current session based on the intervention settings. The method may also include identifying that one of the intervention triggers has occurred in the current session based on detecting the corresponding trigger conditions in the virtual environment. The method may also include modulating a workflow associated with the intervention response that corresponds to the identified intervention trigger based on the interactions between the user and the other users in the virtual environment. The method may also include executing the intervention response in the virtual environment of the current session based on the modulated workflow.

DETAILED DESCRIPTION

Automated interventions may be provided within a virtual environment. Intervention settings for a user may be stored, wherein the intervention settings for the user includes one or more customized intervention triggers each corresponding to one or more trigger conditions and an intervention response. A current session associated with a user device of the user may be monitored, wherein monitoring the current session includes analyzing interactions between the user and one or more other users in a virtual environment of the current session based on the intervention settings. One of the intervention triggers may be identified as having occurred in the current session based on detecting the corresponding trigger conditions in the virtual environment. A workflow associated with the intervention response that corresponds to the identified intervention trigger based on the interactions between the user and the other users in the virtual environment may be modulated. The intervention response in the virtual environment of the current session based on the modulated workflow may be executed.

Figure 1:
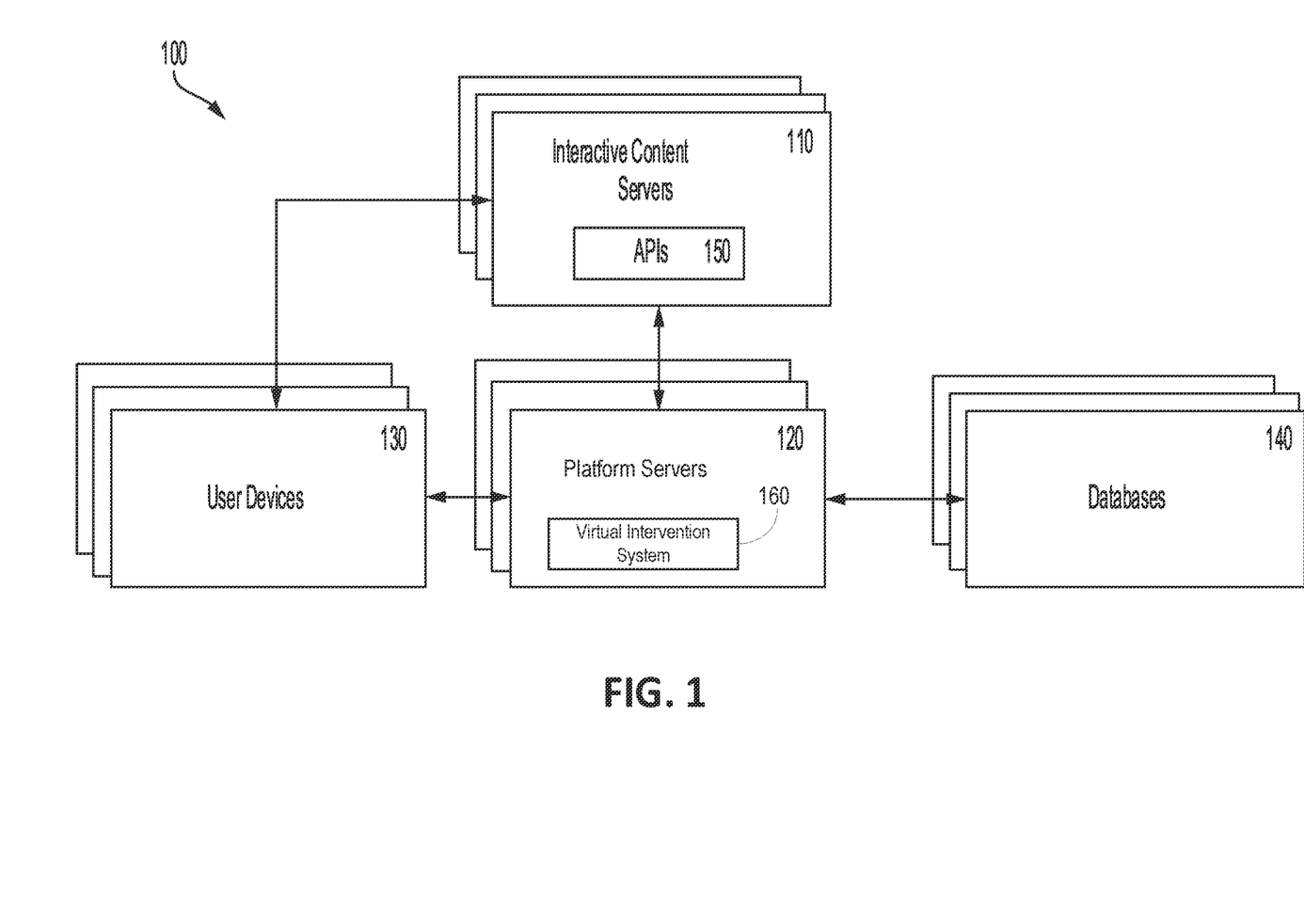
FIG. 1 illustrates a network environment in which a system for automated intervention in a virtual environment may be implemented.

FIG. 1 illustrates a network environment 100 in which a system for automated intervention in a virtual environment may be implemented. The network environment 100 may include one or more interactive content servers 110 that provide streaming content, such as interactive video, video games, etc., one or more platform servers 120, one or more user devices 130, and one or more databases 140.

Interactive content servers 110 may maintain, stream, and host interactive media available to stream or download on a user device 130 over a communication network. Such interactive content servers 110 may be implemented in the cloud, such as one or more cloud servers. Each media may include one or more sets of object data that may be available for participation with by a user, such as viewing or interacting with an activity of the content. Data about the object shown in the media may be stored by the interactive content servers 110, platform servers 120 and/or the user device 130.

The platform servers 120 may be responsible for communicating with the different interactive content servers 110, databases 140, and user devices 130. Such platform servers 120 may be implemented on one or more cloud servers. The interactive content servers 110 may communicate with multiple platform servers 120, though the interactive content servers 110 may be implemented on one or more platform servers 120. The platform servers 120 may also carry out instructions, for example, receiving a user request from a user to stream streaming media, such as games, activities, video, podcasts, User Generated Content ("UGC"), and publisher content. The platform servers 120 may further carry out instructions, for example, for streaming the streaming media content titles.

The streaming media and the associated object data may be provided through an application programming interface (API) 150, which allows various types of interactive content servers 110 to communicate with different platform servers 120 and different user devices 130. API 150 may be specific to the particular computer programming language, operating system, protocols, etc., of the interactive content servers 110 providing the streaming media content titles, the platform servers 120 providing the media and the associated at least one set of object data, and user devices 130 receiving the same. In a network environment 100 that includes multiple different types of interactive content servers 110 (or platform servers 120 or user devices 130), there may likewise be a corresponding number of APIs 150.

The user device 130 may include a plurality of different types of computing devices. For example, the user device 130 may include any number of different gaming consoles, mobile devices, laptops, and desktops. In another example, the user device 130 may be implemented in the cloud. Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. The user devices 130 may include various hardware sensors for detecting user interactions, such as a camera, microphone, haptic feedback input mechanisms, and gyroscopes. Hardware sensors in user devices may be used to capture user response and feedback, such as gestures, speech, and facial expressions. These user devices 130 may also run using a variety of different operating systems, such as iOS or Android. The user devices 130 may also run a variety of applications or computing languages, such as C++ or JavaScript. The user device may include one or more devices associated with a user or a user device capable of displaying on one or more screens.

The databases 140 may be stored on the platform server 120, the interactive content servers 110, on the same server, on different servers, on a single server, across different servers, or on any of the user devices 130. Such databases 140 may store the streaming media and/or an associated set of object data. Such streaming media may depict one or more objects or activities that a user can participate in or interact with. One or more user profiles may also be stored in the databases 140. Each user profile may include information about the user, such as user progress in an activity and/or media content title, user id, or user game characters and may be associated to an entertainment device and media engaged by a user.

A virtual intervention system 160 may be stored on and executed from databases 140, user devices 130, platform servers 120 or interactive content servers 110. The virtual intervention system 160 may track the user of the system by each user profile and store user preferences for workflows executed by the system on databases 140 or user devices 130. The virtual intervention system 160 utilizes a digital display such as a television, projector, monitor, smartphone, virtual reality (VR) head-mounted display or handheld device of a user device 130, and may incorporate one or more physical input devices of a user device 130 such as a touchscreen, remote, controller, joystick, or mouse and keyboard.

Figure 2:
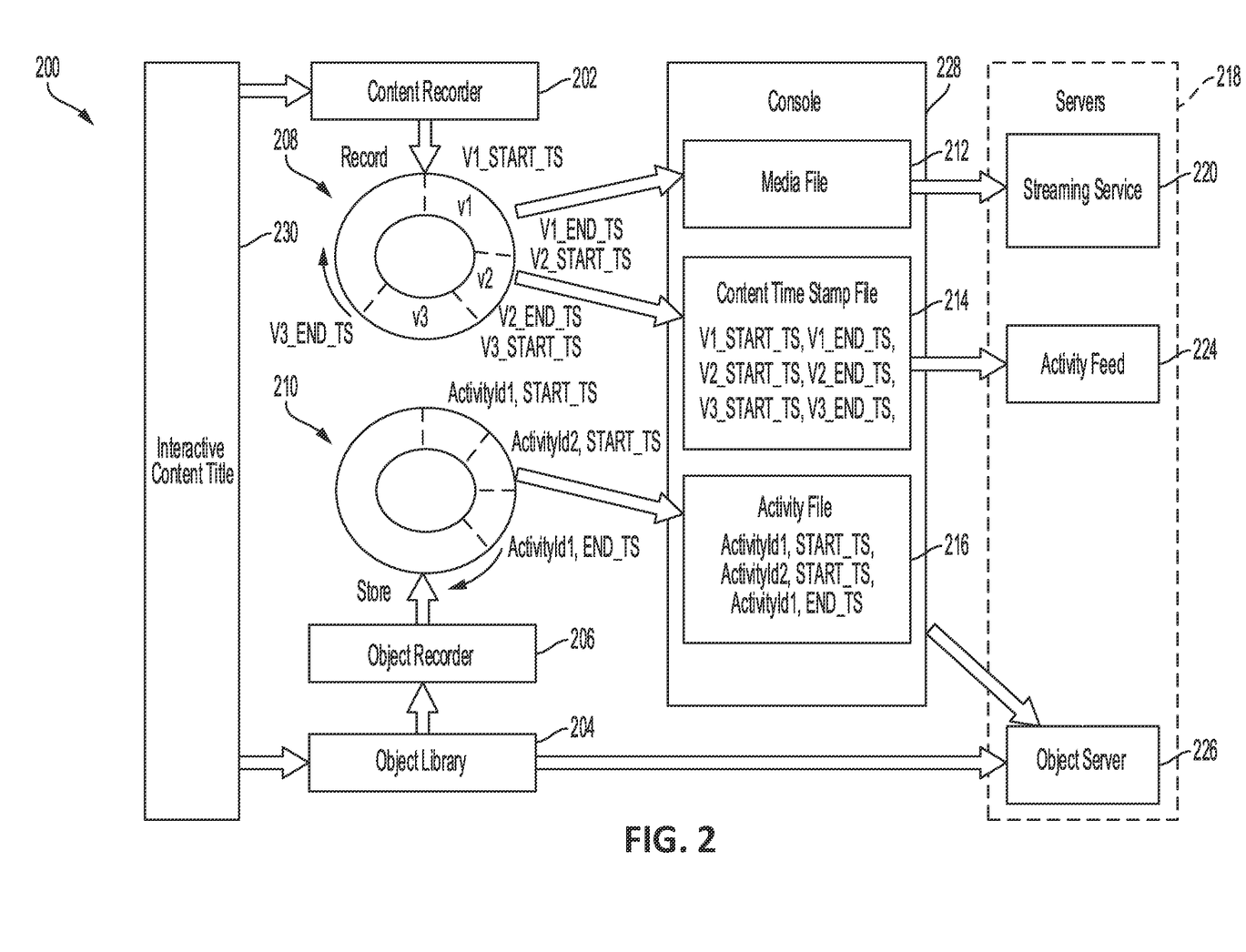
FIG. 2 illustrates an exemplary universal or uniform data system (UDS) that may be used to provide data to a system for automated intervention in a virtual environment.

FIG. 2 illustrates an exemplary universal or uniform data system (UDS) that may be used to provide data to a system for automated intervention in a virtual environment. Based on data provided by UDS, a virtual intervention system 160 detects the objects, entities, activities, other users and events that users have engaged within virtual environment, and thus supports analysis of and coordination with virtual environments and activities. Each user interaction may have metadata for the type of virtual interaction and the location within the virtual environment, as well as other users, objects, entities, among other data associated with a virtual environment session. Thus, metadata for any of the variety of user interactions that can occur in during a virtual environment session, including entities, settings, outcomes, actions, effects, locations, and other users may be tracked. Such data may further be aggregated, applied to data models, and subjected to analytics. Such a UDS data model may be used to assign contextual information to each portion of information in a unified way across virtual environments and interactions.

As illustrated in FIG. 2, an exemplary console 228 (e.g., a user device 130) and exemplary servers 218 (e.g., streaming server 220, an activity feed server 224, and an object server 226) are shown. In one example, the console 228 may be implemented on the platform server 120, a cloud server, or on any of the servers 218. In an exemplary example, a content recorder 202 may be implemented on the platform server 120, a cloud server, or on any of the servers 218. Such content recorder 202 receives and records content (e.g., media) from an interactive content title 230 onto a content ring-buffer 208. Such ring-buffer 208 may store multiple content segments (e.g., v1, v2 and v3), start times for each segment (e.g., V1_START_TS, V2_START_TS, V3_START_TS), and end times for each segment (e.g., V1_END_TS, V2_END_TS, V3_END_TS). Such segments may be stored as a media file 212 (e.g., MP4, WebM, etc.) by the console 228. Such media file 212 may be uploaded to the streaming server 220 for storage and subsequent streaming or use, though the media file 212 may be stored on any server, a cloud server, any console 228, or any user device 130. Such start times and end times for each segment may be stored as a content time stamp file 214 by the console 228. Such content time stamp file 214 may also include a streaming ID, which matches a streaming ID of the media file 212, thereby associating the content time stamp file 214 to the media file 212. Such content time stamp file 214 may be uploaded and stored to the activity feed server 224, though the content time stamp file 214 may be stored on any server, a cloud server, any console 228, or any user device 130.

Concurrent to the content recorder 202 receiving and recording content from the interactive content title 230, an object library 204 receives data from the interactive content title 230, and an object recorder 206 tracks the data to determine when an object begins and ends. The object library 204 and the object recorder 206 may be implemented on the platform server 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the activity data onto an object ring-buffer 210 (e.g., ActivityID1, START_TS; ActivityID2, START_TS; ActivityID3, START_TS). Such activity data recorded onto the object ring-buffer 210 may be stored in the object file 216. Such object file 216 may also include activity start times, activity end times, an activity ID, activity results, activity types (e.g., tutorial interaction, menu access, tasks, engagement with other users etc.), user or peer data related to the activity. For example, an object file 216 may store data regarding an interaction with another user in a public virtual environment. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the console 228 stores and associates the content time stamp file 214 with the object file 216 based on a match between the streaming ID of the content time stamp file 214 and a corresponding activity ID of the object file 216. In another example, the object server 226 may store the object file 216 and may receive a query from the console 228 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the console 228, though the association may be performed by any server, a cloud server, or any user device 130. In another example, an object file 216 and a content time stamp file 214 may be associated by the console 228 during creation of each file 216, 214.

In some embodiments, the object file 216 may include real-time data received from other users of a virtual environment in the interactive content title. Such user transmitted object data of the object file 216 may include voice communication, text communication, and avatar information (e.g. three-dimensional character information, gestures, etc.) associated with another user and user profile. The UDS 200 may separate such user transmitted object data from object data of the virtual environment and may send the user transmitted object data to a virtual intervention system 160. The user transmitted object data may be received by the UDS and subsequently received by the virtual intervention system 160 for real-time analysis before being displayed or played via user devices 130.

Figure 3:
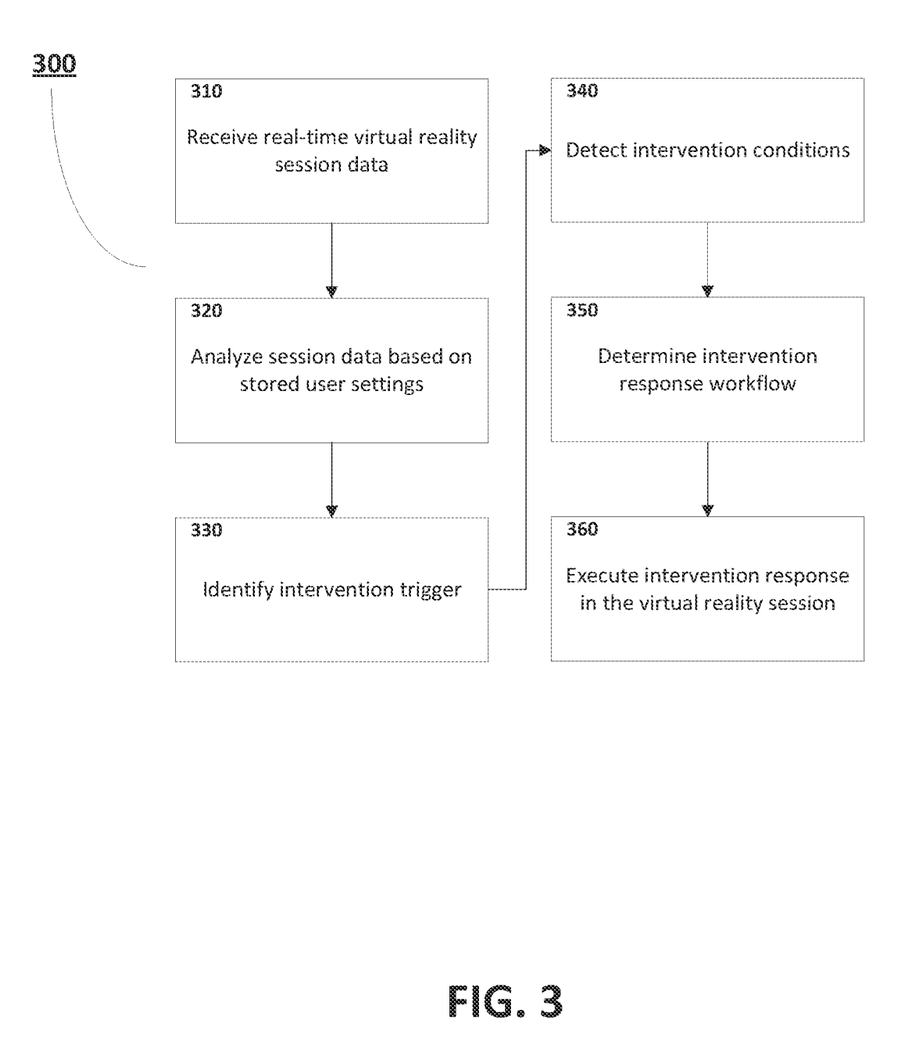
FIG. 3 is a flowchart illustrating an exemplary method for automated intervention in a virtual environment.

FIG. 3 is a flowchart illustrating an exemplary method for providing a system for automated intervention in a virtual environment. The steps identified in FIG. 3 are exemplary and may include various alternatives, equivalents, or derivations thereof including but not limited to the order of execution of the same. The steps of the process of FIG. 3 and any alternative similar processes may be embodied in hardware or software including a computer-readable storage medium including instructions executable by the likes of a processor in a computing device. The exemplary process illustrated in FIG. 3 may be performed repeatedly during use of a system for automated intervention in a virtual environment.

Embodiments described in the exemplary method of FIG. 3 include execution of steps for automated intervention in user interactions within a virtual reality (VR) environment. Other embodiments may include similar steps executed in any number of virtual environments not limited to virtual reality, such as game environments, video conferencing, or chat rooms.

In step 310, a virtual intervention system 160 may receive real-time virtual environment session data from an interactive content server 110, platform server 120, or UDS 200. Real-time data received by the virtual intervention system 160 may pertain to an object, avatar, or user associated with the virtual environment, or any combination thereof. The virtual intervention system 160 may associate user data (e.g., character or avatar information and location, a user profile, interaction history of the user and other users) with intervention settings stored on a user device 130, platform servers 120, or databases 140. The virtual intervention system 160 may also receive data regarding structure and organization of the virtual environment session, including a title, room name, access settings (public or private session), a list of connected users, user interactions, and other object data collected by a UDS 200 as described in FIG. 2. The virtual intervention system 160 may further receive object data for each other user in the virtual environment including network user profile information (e.g., username), character or avatar appearance and location in the environment, voice or text communication transmissions, and interaction data for the user within the environment, such as gestures performed by an avatar.

In addition to object data received from the UDS 200, the virtual intervention system 160 may receive sensor data collected from various sensors incorporated in user devices 130. Sensors may include video or image cameras, gyroscopes, haptic feedback devices, microphones, head-mounted display VR sensors (e.g., infrared eye trackers), heart rate monitors, and a variety of similar devices. The virtual intervention system 160 may combine sensor data with object data of the user throughout additional steps in process 300.

In step 320, the virtual intervention system 160 analyzes virtual environment session data for the user, environment, and each other user in real-time. Analysis may include comparing the virtual environment session data to intervention settings configured by the user. Intervention settings for the virtual intervention system 160 may include preferences for triggers to initiate an intervention, conditions that a user or environment must meet to initiate a trigger, types of media to associate with different triggers and conditions, and responses to execute when intervening. Embodiments of a variety of intervention settings for intervention triggers, conditions, responses, and types of media are described in further detail in later steps of process 300. Because the intervention settings may be personalized to the user, different users may be associated with different intervention settings and therefore different intervention triggers and different intervention actions.

The user may configure and personalize their intervention settings via an input mechanism and a display generated by the virtual intervention system 160 on any number of user devices 130 that may be used to access a virtual environment. The virtual intervention system 160 may store the intervention settings of the user in memory of user devices 130, platform servers 120, databases 140, or any combination therein, and may associate the intervention settings to the user profile of the user. The user may define and update intervention settings at any point during the use of the virtual intervention system 160, whether by directly specifying specific settings or adjusting prior or default settings. In some embodiments, the virtual intervention system 160 may automatically configure default intervention settings for the user, such as configuring a trigger setting that corresponds to the default resting heart rate of a heart rate monitor worn by the user. Based on real-time analysis and intervention settings of the user, the virtual intervention system 160 may implement automated interventions in a way that is tailored to the specific user.

In step 330, the virtual intervention system 160 identifies an occurrence of an intervention trigger in real-time during user interaction in the virtual environment. Some intervention triggers may be initiated based on user input provided to the virtual intervention system 160. For example, a predetermined user input may be initiated via an input mechanism of one of the user devices 130, such as a controller, or via a sensor of the user device 130, such as a camera or a microphone. Such predetermined user input may include user speech or gestures. For example, a user may configure a "safe word," such as a word or phrase known only to the user, which may be detected by the microphone of a user device 130. Upon recording the user speaking the "safe word" phrase, the virtual intervention system 160 may identify the predetermined command was issued to initiate an intervention trigger. In a different embodiment, an intervention trigger may be configured for a predetermined gesture initiated by user body movements based on intervention settings. The predetermined gesture may be recorded by sensors of the user device 130, such as a camera or motion controller of a VR device.

In addition, the virtual intervention system 160 may monitor the virtual environment of the user for one or more trigger conditions specified by the intervention settings of the user. Based on such monitoring, the virtual intervention system 160 may identify a variety of conditions based on real-time data from the virtual environment and other users of the environment. In some embodiments, the user may configure intervention settings associated with automated triggers. In other embodiments, the virtual intervention system 160 may preemptively identify automated triggers based on default, shared, or learned intervention settings without direct input from the user. Automated triggers may include detecting object data in the virtual environment containing particular gestures or language, speech above a threshold volume, proximity of the user to other users and avatars in the virtual environment, and any other combination of conditions detectable within the virtual environment. Artificial intelligence and machine learning may also use data regarding user behaviors within the virtual environment to detect patterns and to generate intervention settings based on such patterns. For example, certain behavioral patterns by an offending user may cause other users to block, mute, disable, distance, or otherwise avoid the offending user. Such repeated patterns may result in a learned intervention setting that associates the behavioral pattern with one or more intervention actions. Such patterns may further be associated with different social groups, whereby similar behaviors may result in different outcomes. For example, friend groups (e.g., users on a friends list or with whom a user frequently interacts) may be permitted more leeway (e.g., different thresholds) or associated with entirely different settings, while relative strangers may be held to a more stringent standard of behavior in accordance with user settings.

The virtual intervention system 160 may also detect spoken phrases or user gestures associated with defensive language and may identify such phrases or gestures as intervention triggers. In such instances, the virtual intervention system 160 may detect speech from the user or body movements associated with defensive language regardless of configured user phrases or gestures. For example, a user may speak words or phrases, such as "stop" or "leave me alone," and the virtual intervention system may identify the speech as defensive. The virtual intervention system 160 may further initiate an intervention trigger based on detecting defensive speech. In a different example, a user may raise a hand and make a pushing motion with a VR controller, and the virtual intervention system 160 may initiate an intervention trigger based on identifying the gesture as defensive.

In one embodiment, an automated trigger may be configured by the user to identify an intervention trigger for detecting offensive language from other users. The user may configure a variety of intervention settings for the intervention trigger such as settings associated with foul language, hostile language, spamming (e.g., repeating phrases or words), rude gestures, explicit gestures, avatar emotes (e.g., animations) and spamming thereof, etc. Alternatively, the virtual intervention system 160 may automatically identify such language and gestures in the absence of a user configured intervention setting.

In a different embodiment, an automated trigger may be configured by the virtual intervention system 160 to identify speech of another user in the virtual environment with volume above a threshold volume. The threshold volume may be set in a variety of ways, such as a predetermined user intervention setting for volume, by the virtual intervention system 160 comparing and detecting speech at a greater volume than other users, or by a predetermined volume measurement associated with yelling (e.g., 85 decibels). The virtual intervention system 160 may analyze real-time voice object data from other users and may detect a user with sustained speech volume above the threshold, initiating an intervention trigger. Alternatively, the virtual intervention system 160 may detect changes in speech volume of another user to identify an intervention trigger. A threshold may be set based on the relative volume of the user and other users in the environment. When the virtual intervention system 160 detects changes in volume of speech of another user relative to volume of speech in the virtual environment, an intervention trigger may be detected.

In yet a different embodiment, an automated trigger may be configured by the user for detecting proximity of avatars of other users in the virtual environment. The user may configure intervention settings to create a "personal bubble" or a barrier (or forcefield) in any shape around the user avatar in a virtual environment. The personal bubble may include configuring tiered distances of radii measured outward from the user avatar, and each tiered distance may be associated with a different intervention trigger. For example, the user may configure an intervention setting for the virtual intervention system 160 to identify other user avatars within 6 meters as having entered a first tier of a personal bubble for the user. The user may further configure an intervention setting to identify other user avatars within 3 meters and within 1 meter of the user, associated with a second tier and third tier of the personal bubble, respectively. The first, second, and third tier of the personal bubble may be identified as different triggers by the virtual intervention system 160.

Intervention triggers may be customized by the user for different types of media. In some embodiments, the user may configure intervention settings for intervention triggers that apply to any virtual environment. For example, a user may configure intervention settings for detecting offensive speech, applying the intervention trigger to any virtual environment session where voice chat is available. In a different embodiment, the user may configure intervention settings for intervention triggers that apply to an individual media content item or to an individual virtual environment within a media content item. For example, the user may configure an intervention trigger for using a personal space bubble in a particular video game. The intervention trigger may include a personal space radius configuration for public sessions with other players and may include a different personal space radius configuration for private or friends only sessions. In another example, a user may configure different intervention settings for different media, such as a video game or a virtual meeting. A video game that includes a three-dimensional environment may include settings for a personal space bubble, while a virtual meeting that includes video and audio, but no three-dimensional environment may include different intervention settings appropriate for the media, such as removing the display of camera video from another user.

Identification of any occurrence of the manual or automated intervention triggers may result in the virtual intervention system 160 executing further steps in process 300.

In step 340, the virtual intervention system detects conditions met by an interaction associated with an intervention trigger. Conditions may include configuration based on a relationship of the user to other users in the virtual environment, access settings of the virtual environment, and a type of media content in which the virtual environment exists.

Certain trigger conditions may be configured by the user, while other trigger conditions are set by the virtual intervention system 160. Each intervention trigger may be associated with one or more trigger conditions. In some embodiments, each trigger condition associated with an intervention trigger must be fulfilled before the virtual intervention system executes an intervention workflow.

Trigger conditions associated with the relationship of the user to other users may also include social connection of the user with each other user and the history of the user with each other user. The virtual intervention system 160 may track each interaction of the user with each other user and may record a history for the interactions. Other users that have no prior record of interaction with the user may be considered unknown to the user, while other users with a positive record of interaction or are socially connected to the user may be considered as familiar to the user. Other users with a positive record of interaction may be associated with a different set of trigger conditions for an intervention trigger than users with no record or a negative record of interaction. For example, the virtual intervention system 160 may identify an intervention trigger associated with the use of foul language by another user in the virtual environment. The other user may also have a history of positive prior interactions with the user, where the prior interactions have included the use of similar speech containing foul language. In such a case, the virtual intervention system 160 may disable the intervention trigger based on the prior history of the user and the other user. The intervention trigger that has been disabled for a specific other user may continue to apply to other users with different prior histories of interaction with the user.

Trigger conditions may further be associated with access settings of virtual environments. Access settings for virtual environments may include whether the virtual environment is a public space or a private space. Private spaces may be virtual environments configured by the user and may contain a passcode or some other secured access. The user may configure trigger conditions for private spaces, such as disabling some or all intervention triggers when in a private space. Public spaces may be virtual environments in which the user lacks control over what users enter the virtual environments. The user may configure trigger conditions for public spaces, such as enabling different intervention triggers than configured for a private space, or allowing the virtual intervention system 160 to detect infractions by other users preemptively when in a public space.

The user may also customize trigger conditions based on the type of media in which the virtual environment exists. In one example, different trigger conditions may be configured for a video game or a virtual concert, such as conditions for entering a personal space bubble. In a video game, the user may configure the personal space bubble to have a larger radius than a virtual concert where users may be much closer to each other. In the virtual concert, the intervention trigger may include a condition that detects an infraction only when breaching the inner-most bubble of the user, compared to a condition that detects the same infraction at a greater distance from the user in the video game. An exemplary personal space bubble is described in further detail in FIG. 4.

In step 350, the virtual intervention system 160 determines an intervention response workflow. The intervention response workflow may be determined based on an interaction in the virtual environment initiating an intervention trigger and meeting trigger conditions during the occurrence of an intervention trigger.

The virtual intervention system 160 may modulate the intervention response workflow by determining a severity level of infraction for an interaction that is identified in an intervention trigger. In one embodiment, the virtual intervention system 160 may identify an infraction of an intervention trigger associated with offensive language or a gesture used by another user. The speech may be detected at a very low volume, and as speech directed away from the user of the virtual intervention system 160. Such an infraction may be determined to be a low importance infraction compared to the same offensive language spoken at a loud volume in the direction of the user of the intervention system 160.

The virtual intervention system 160 may further adjust the severity level of the infraction based on a reaction of the user. A notification may be displayed and a user response to the notification may be recorded to adjust the severity level of an infraction. Sensor data collected from microphones, cameras, eye tracking devices, and heart rate monitors may also be used in combination with artificial intelligence to assess the reaction of the user to an infraction. For example, the user may be subjected to a flagged gesture by another user in close proximity to the user within the virtual environment. Initially, the flagged gesture may be identified by the virtual intervention system 160 as a high importance infraction corresponding to gestures that may have been offensive to other users. A notification may be displayed in a heads-up display of the user asking if the flagged gesture is offensive or otherwise unwanted by the user. The user may select that the gesture was or was not offensive. If the user selects the gesture was not offensive, the virtual intervention system 160 may adjust the infraction to a lower severity. Additionally, sensors of the user device 130 (e.g., heart rate monitor, camera, microphone) may record physical indicators and responses of the user that may be associated with stress or discomfort. Artificial intelligence and machine learning may be used by the virtual intervention system 160 to identify and flag high stress indicators (e.g., increased heart rate, rapid eye movement) recorded in sensor data in response to the flagged gesture. The virtual intervention system 160 may adjust the severity level of the infraction to a higher importance when a user emotional response is identified as a negative emotional response.

Based on the combined factors of a virtual interaction and modulation of a determined workflow for such factors, the virtual intervention system 160 may execute further steps in process 300.

In step 360, the virtual intervention system 160 executes an intervention response in the virtual environment based on a determined workflow. The intervention response may be customized by the user or configured by the virtual intervention system 160. The intervention response may include a variety of response types, such as removing the user from the virtual environment, removing another user from the virtual environment, hiding, muting, or disabling the avatar of another user or muting another user, enabling a proximity barrier (i.e., a physical separator based on distances in a personal bubble), and other similar responses.

In one embodiment, the intervention response may include removing the user or another user from the virtual environment. The virtual intervention system 160 may execute the removal of the user or another user for a variety of reasons, such as a user configured intervention setting corresponding to an intervention trigger for high importance infractions in a public virtual space. In some cases, the virtual intervention system 160 may remove the user from a virtual environment when a preference for removing another user cannot be executed. For example, a user may have configured an intervention response to remove other users from the virtual environment for infractions associated with rude gestures. In a public virtual space, the virtual intervention system 160 may be unable to remove an offending other user, and may instead remove the user from the interaction, relocating them to a private space. Alternatively or in addition, the conflicting users may be prevented from viewing or otherwise interacting with each other. The offended user may prefer to hide themselves or otherwise render themselves invisible and/or muted to another, or the offended user may prefer to render the other user invisible and/or mute (e.g., so as to avoid offensive visual displays and sounds).

In a different embodiment, the virtual intervention system 160 may execute an intervention response in which an offending other user is visually hidden or muted for the user. The virtual intervention system 160 may mask the presence of another user that is causing an infraction by removing their avatar from the view of the user, muting the speech of the other user, or both. In some instances, the user avatar may also be hidden from view of the offending other user. The virtual intervention system 160 may also execute such a response in the event that another user cannot be removed from a virtual environment.

In yet a different embodiment, the virtual intervention system 160 may execute an intervention response in which an offending other user is moved outside of a personal bubble range or restricted from entering the personal bubble range of the user. The personal bubble may be configured as part of an intervention trigger, described in step 330, and may include distances from the user based on different infractions. Based on the infraction and corresponding configuration of the personal bubble for the user, the other user may be restricted from entering different levels or sections of the user personal bubble. In some instances, the virtual intervention system 160 may also combine the intervention response for a personal bubble with previously described embodiments, such as muting speech or hiding the avatar of the offending other user.

In some embodiments, the user may receive a prompt to accept or reject a response before the virtual intervention system 160 executes the response. The virtual intervention system 160 may adjust which automatic responses are executed and which triggers and conditions are associated with automatic responses based on such prompted user input for executing responses. The virtual intervention system 160 may also adjust automatic responses based on the reaction of the user captured by sensors, such as camera and microphone input detected when a response is executed. For example, the user may be interacting with another user in a virtual environment, and the other avatar user may get within 1 meter of the user. The virtual intervention system 160 may eject the other user from the environment for being too close to the user of the system. The user may speak a phrase, such as "Oh no!" and the virtual intervention system 160 may associate the speech with the response for ejecting the other user. The virtual intervention system 160 may reverse the action taken by the executed response, adjust the automatic response for the associated other user, and may provide a prompt to the user in the future before executing a similar response.

Intervention responses may be escalated to increasingly strict responses based on continued infractions by another user. For example, another user that has been moved outside of a personal bubble for the user may cause additional infractions, activating additional intervention responses, such as removing the other user from the environment or preventing the other user from interacting with the user indefinitely.

The user may also bypass intervention responses and workflows at any time with the use of a safe word or gesture described in previous steps of process 300. The virtual intervention system 160 may record when a user bypasses an intervention trigger and may learn from the behavior, such as adjusting automated conditions and responses to update current workflows.

In certain embodiments, the virtual intervention system 160 may act preemptively to prevent potential infractions. The virtual intervention system 160 may assess the entire virtual environment in real-time, including areas, other users, and events that the user has not yet recognized. The virtual intervention system 160 may execute intervention responses to prevent potential infractions based on detected behavior of other users in the environment. For example, at a virtual concert containing hundreds of users, the virtual intervention system 160 may detect conversations outside of the hearing range of the user between other users that may contain offensive language. An intervention response may be executed by the virtual intervention system 160, such as muting the other users to prevent the offensive language from being heard by the user before the other users reach the proximity of the user. In a different example, the virtual intervention system 160 may detect another user making a rude gesture towards the user from outside the peripheral view of the user. The other user may also be detected as moving towards the user in the virtual environment. The virtual intervention system 160 may associate the behavior with potential conflict or bullying. To prevent such interaction, the virtual intervention system 160 may execute an intervention response, such as hiding the other user or removing the other user.

The virtual intervention system 160 may learn behavior of a user and other users in virtual environments over time as each interaction is recorded and intervention responses are delivered. Repeated executed responses or rejection of responses by a user may update workflows of the virtual intervention system 160 and provide examples of situations that should be preemptively mitigated. Additionally, the virtual intervention system 160 may aggregate preferences for configurations, responses, and other customized aspects of the intervention system anonymously from any user on the network. The virtual intervention system 160 may suggest customized configurations, such as triggers or responses, based on the configuration of other users. The virtual intervention system 160 may also enable automated preemptive mitigation techniques based on such configuration of other users. For example, a user may speak a safe word or phrase in response to hearing a new offensive term. The virtual intervention system 160 may track the behavior and similar behaviors associated with intervention triggers to the same offensive term across various users of the system on the network. Based on such a pattern of detected behavior, the virtual intervention system 160 may preemptively configure a trigger for a user that frequently avoids offensive speech of other users.

Figure 4:
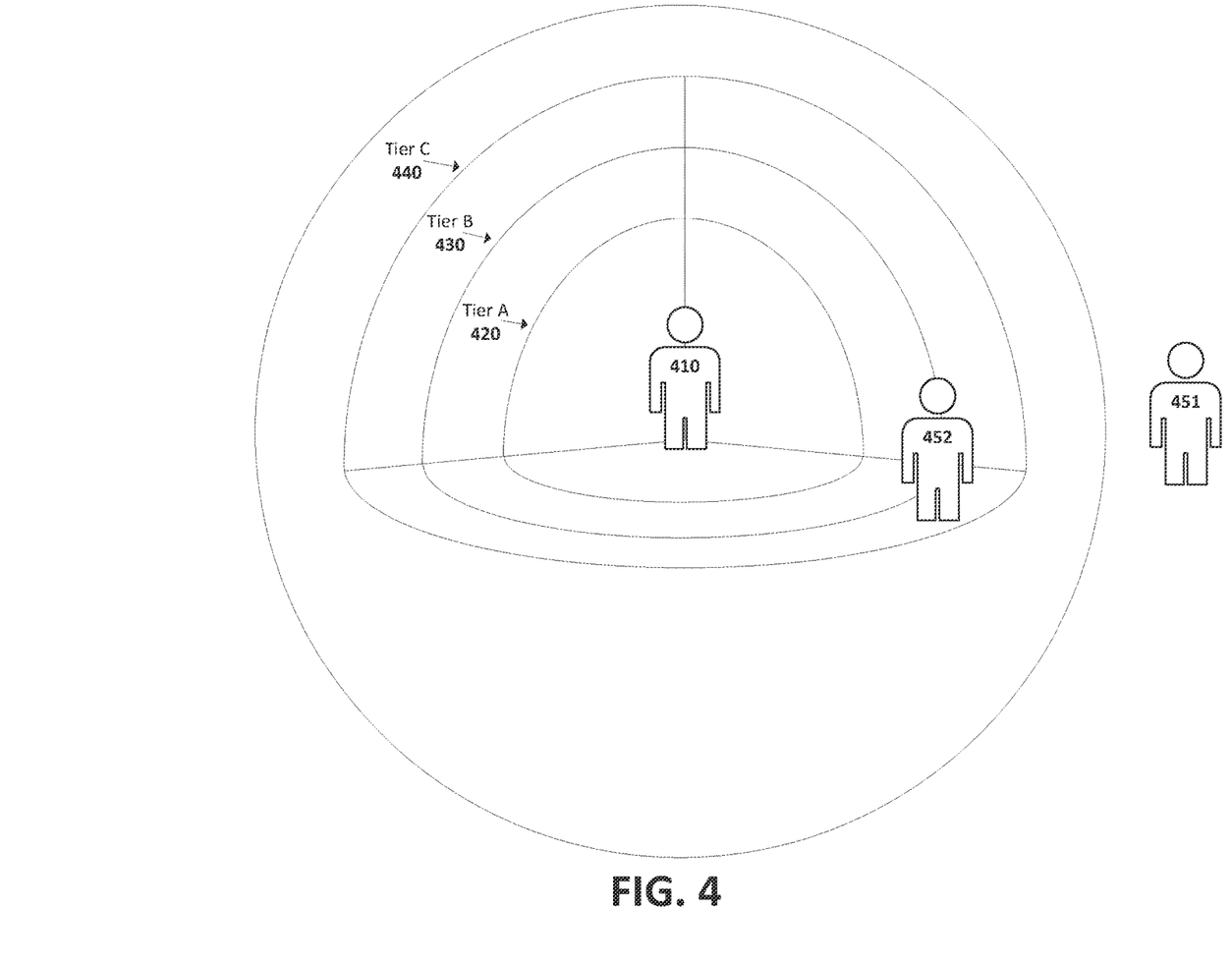
FIG. 4 illustrates exemplary personal space bubbles around a user avatar in a virtual environment.

FIG. 4 illustrates exemplary personal space bubbles 420-440 around a user avatar 410 in a virtual environment. The personal space bubbles 420-440 may be enabled by the user in three-dimensional virtual environments where the user is in control of a player character or a user avatar 410, such as a video game or virtual reality environment. While illustrated as spherical, the personal space bubbles 420-440 may be defined to correspond to a variety of different shapes. As illustrated, personal space bubbles 420-440 may corresponding to radii of different lengths extending outward from the user avatar 410 in multiple directions. The different radii of the personal space bubbles 420-440 may correspond to different tiers, such as Tier A, Tier B, and Tier C. Each tier may be configured by the user to encompass different areas within the personal space bubbles 420-440 extending from the user avatar 410. For example, the space corresponding to Tier A may encompass a spherical area centered on the user avatar 410 and having a radius of 1 meter (or other unit), while Tier B may encompass a spherical layer outside of Tier A that extends to 3 meters from the user avatar 410, and Tier C may encompass a spherical layer outside of Tier B that extends to 6 meters from the user avatar 410. Each tier may also be configured by the user to correspond to different intervention triggers, conditions, responses, other users, and virtual environments as described in the process of FIG. 3.

The virtual intervention system 160 may detect whether other users are inside or outside of any of the personal space bubbles 420-440 based on the distance between other user avatars and the user avatar 410. For example, other user avatar 451 is determined to be outside the personal space bubbles 420-440, and a different other user avatar 452 is determined to be inside of the personal space bubble 440 corresponding to Tier C. The virtual intervention system 160 may identify different triggers and conditions for triggering responses and execute different responses based on distance of the other users from the user avatar 410. For example, the virtual intervention system 160 may monitor the other user avatar 452 for infractions associated with Tier C of the personal space bubble 440. In a different example, the virtual intervention system 160 may monitor other user avatar 451 to preemptively mitigate any potential infractions, even if the other user avatar 451 is not within the personal space bubbles 420-440.

In a different embodiment, social connections of a user (i.e., friends), may execute a personal space bubble response for the user. Friends of the user may optionally be given access by the user to view settings of the user, receive notifications when the user triggers a response, and may trigger a response for the user. For example, in a virtual environment, a friend of the user may notice an offensive behavior or speech of a different user that would be unwanted by the user of the virtual intervention system 160. The friend of the user may preemptively trigger a personal space bubble response to avoid the user interacting with the offending different user, such as muting or hiding the offending different users' avatar.

Figure 5:
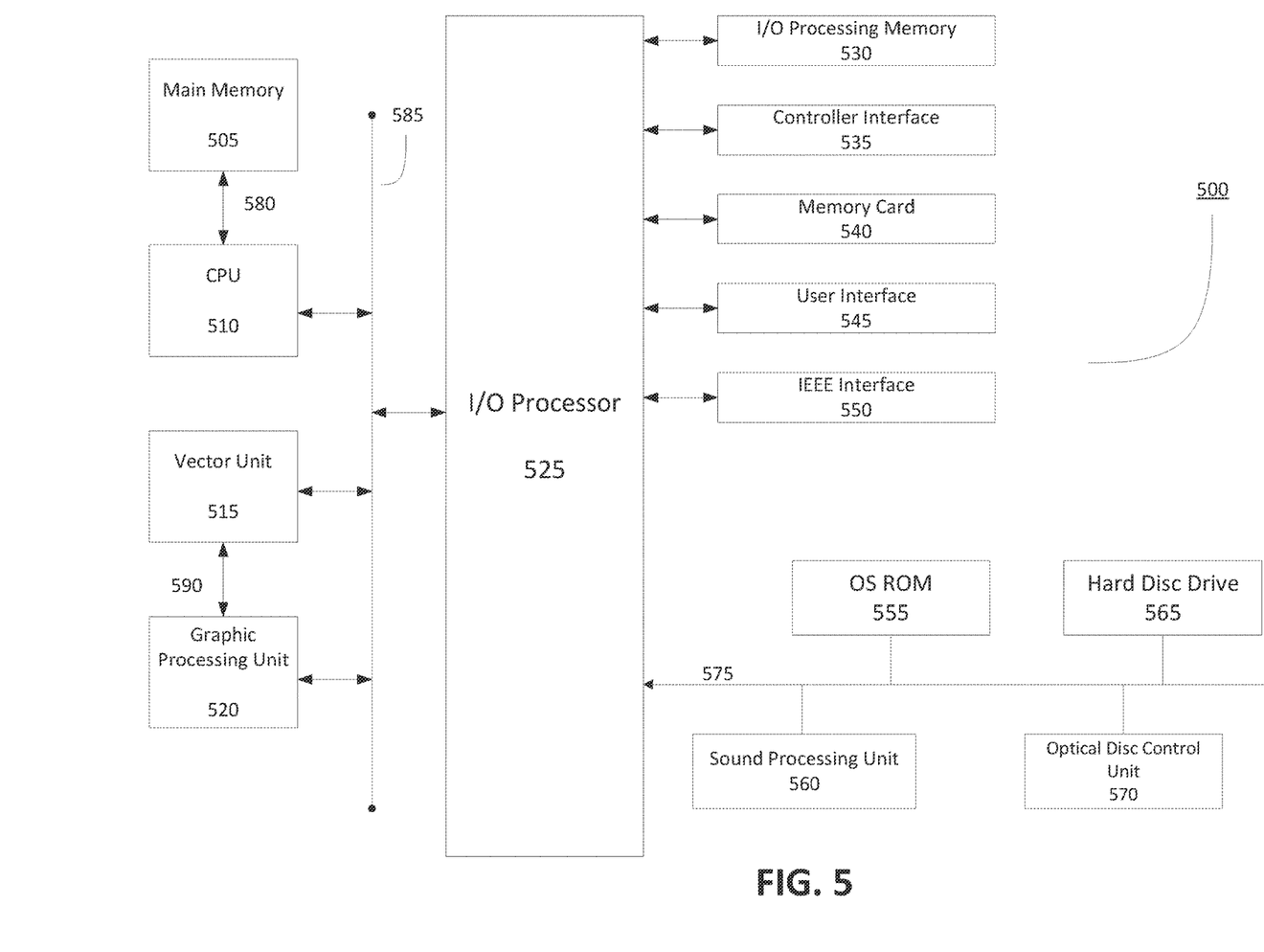
FIG. 5 is a block diagram of an exemplary electronic entertainment system.

FIG. 5 is a block diagram of an exemplary electronic entertainment system 500. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 585. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., 5G, LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The system may be implemented in an application that may be operable by a variety of end user devices. For example, an end user device may be a personal computer, a home entertainment system (e.g., Sony PlayStation2® or Sony PlayStation3® or Sony PlayStation4®, or Sony PlayStation5®), a portable gaming device (e.g., Sony PSP® or Sony Vita®), or a home entertainment system of a different albeit inferior manufacturer. The present methodologies described herein are fully intended to be operable on a variety of devices. The system may also be implemented with cross-title neutrality wherein an embodiment of the present system may be utilized across a variety of titles from various publishers.

The present system may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for automated intervention in virtual environments, the method comprising:
    storing intervention settings for a user, wherein the intervention settings for the user includes one or more intervention triggers each corresponding to one or more trigger conditions and an intervention response;
    customizing one or more of the intervention settings based on a pattern determined based on detected responses by other users;
    monitoring interactions in a virtual environment of a current session associated with a user device of the user based on the customized one or more of the intervention settings;
    identifying the one or more intervention triggers of the customized one or more of the intervention settings have been met by one of the monitored interactions with an offending user outside of a predetermined range from an avatar of the user within the virtual environment;
    modulating a workflow by customizing the intervention response that corresponds to the identified one or more intervention triggers based on a severity level of infraction; and
    executing the customized intervention response in the virtual environment of the current session based on the modulated workflow when the offending user comes within the predetermined range.

2. The method of claim 1, wherein the one or more trigger conditions include a predetermined command by the user.

3. The method of claim 1, wherein the one or more trigger conditions include offensive language or gestures by one or more of the other users.

4. The method of claim 1, wherein the one or more trigger conditions include defensive language or gestures by the user.

5. The method of claim 1, wherein the one or more trigger conditions include a distance between an avatar of the user and one or more avatars of the other users that is less than a threshold distance.

6. The method of claim 1, wherein the one or more trigger conditions include a volume of one or more utterances by the user or the other users that exceeds a threshold volume.

7. The method of claim 1, wherein detecting the one or more trigger conditions is further based on any prior positive interaction between the user and the other users.

8. The method of claim 1, wherein detecting the one or more trigger conditions is further based on whether the other users appear in a predetermined list of peers.

9. The method of claim 1, wherein detecting the one or more trigger conditions is further based on whether an avatar of the user is in a private space or a public space within the virtual environment.

10. The method of claim 1, further comprising customizing the one or more intervention triggers or the one or more trigger conditions based on a type of media content engaged by the user.

11. The method of claim 1, further comprising bypassing the intervention response based on receiving a predetermined user command.

12. The method of claim 1, wherein modulating the workflow includes determining the severity level of infraction by the other users.

13. The method of claim 12, further comprising adjusting the severity level of infraction based on a reaction of the user to the other users.

14. The method of claim 1, wherein the customized intervention response includes moving an avatar of the user within the virtual environment.

15. The method of claim 1, wherein the customized intervention response includes moving one or more avatars of the other users within the virtual environment.

16. The method of claim 1, wherein the customized intervention response includes preventing one or more avatars of the other users from entering a defined space within the virtual environment, and wherein the space is defined as encompassing an area within a predetermined distance of an avatar of the user.

17. The method of claim 1, further comprising identifying a different behavioral pattern associating a different type of user group with a different outcome during gameplay by the user within the virtual environment.

18. The method of claim 17, wherein same actions by another user that is part of the different type of user group triggers a different customized intervention trigger and results in a different customized intervention response.

19. A system for automated intervention in virtual environments, the system comprising:
  a memory that stores intervention settings for a user, wherein the intervention settings for the user includes one or more intervention triggers each corresponding to one or more trigger conditions and an intervention response;
  a communication network interface that communicates over a communication network to receive monitoring data regarding a virtual environment of a current session associated with a user device of the user; and a processor that executes instructions stored in memory, wherein the processor executes the instructions to:
  customize one or more of the intervention settings based on a pattern determined based on detected responses by other users;
  monitor interactions in the virtual environment of the current session based on the customized one or more of the intervention settings,
  identify the one or more intervention triggers of the customized one or more of the intervention settings have been met by one of the monitored interactions with an offending user outside of a predetermined range from an avatar of the user within the virtual environment;
  modulate a workflow by customizing the intervention response that corresponds to the identified one or more intervention triggers based on a severity level of infraction; and execute the customized intervention response in the virtual environment of the current session based on the modulated workflow when the offending user comes within the predetermined range.

20. A non-transitory computer-readable storage medium, having embodied thereon a program executable by a processor to perform a method for automated intervention in virtual environments, the method comprising: storing intervention settings for a user, wherein the intervention settings for the user includes one or more intervention triggers each corresponding to one or more trigger conditions and an intervention response;
  customizing one or more of the intervention settings based on a pattern determined based on detected responses by other users;
  monitoring interactions in a virtual environment of a current session associated with a user device of the user based on the customized one or more of the intervention settings;
  identifying the one or more intervention triggers of the customized one or more of the intervention settings have been met by one of the monitored interactions with an offending user outside of a predetermined range from an avatar of the user within the virtual environment;
  modulating a workflow by customizing the intervention response that corresponds to the identified one or more intervention triggers based on a severity level of infraction; and executing the customized intervention response in the virtual environment of the current session based on the modulated workflow when the offending user comes within the predetermined range.

* * * * *